Figure 4:
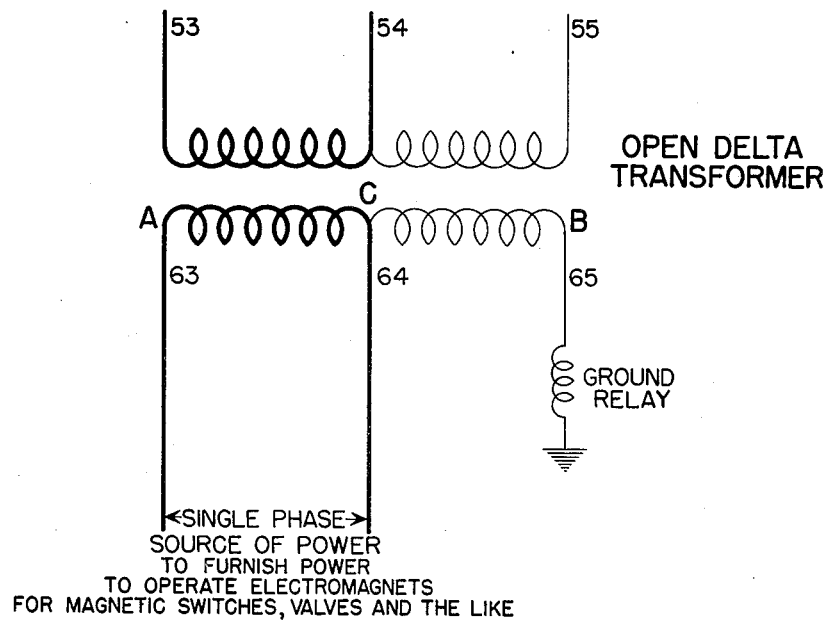

April 25, 1950      W. J. HUDSON      2,505,246
DETECTOR OF ELECTRICAL GROUND CURRENTS
Filed June 18, 1947      2 Sheets-Sheet 1
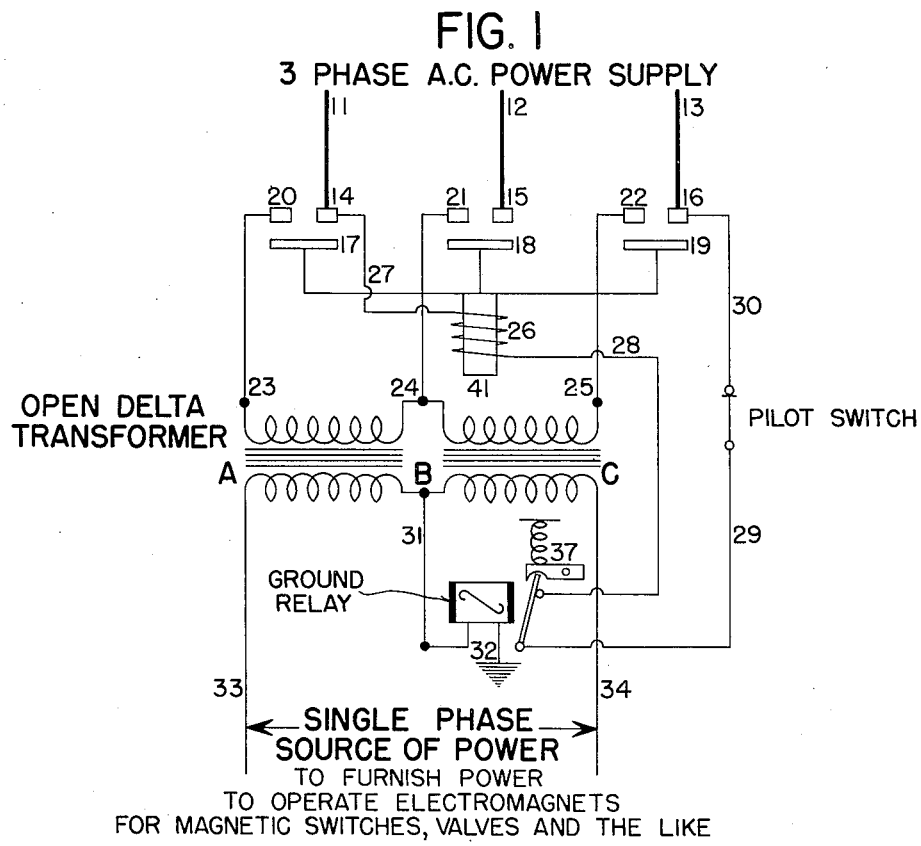
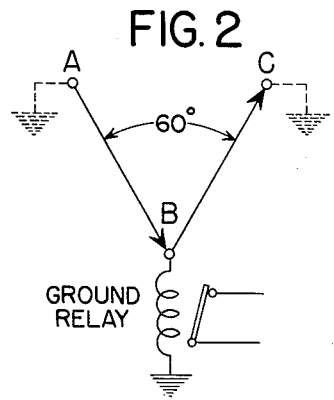
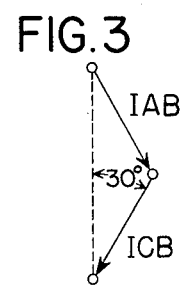
INVENTOR
WILLIAM JOHN HUDSON
BY Walter S. Pfeifer
ATTORNEY April 25, 1950     W. J. HUDSON     2,505,246
DETECTOR OF ELECTRICAL GROUND CURRENTS Filed June 18, 1947     2 Sheets—Sheet 2

INVENTOR
WILLIAM JOHN HUDSON
BY Walter S. Pfeifer
ATTORNEY

Patented Apr. 25, 1950

2,505,246

UNITED STATES PATENT OFFICE 2,505,246

DETECTOR OF ELECTRICAL GROUND CURRENTS

William John Hudson, Milwaukee, Wis., assignor to Allen-Bradley Company, Milwaukee, Wis., a corporation of Wisconsin Application June 18, 1947, Serial No. 755,335

4 Claims. (Cl. 175—294)

My invention relates in general to the detection of leakage currents in alternating electrical current power systems and, in particular, to a system wherein an instrumentality connected to ground becomes energized when leakage current exists. My invention protects against leakage from any one of the two conductors supplying current to a load and also protects against leakage if a ground should occur on both of the power conductors at the same moment. In the operation of machinery driven by electrical motors such as punch presses or the like there are often cases where there are many circuits having manually or electrical operable pilot switches, relays and travel limit switches incorporated therein. These circuits are distributed about the machinery and in the operation of the machine may become grounded through hard usage and by oil and dirt which naturally accumulates around such machinery. It is therefore one of the objects of this invention to safeguard against the operation of the machinery which may cause damage, injury or loss of life by accidental grounding or leakage of current. Further, it is an object of my invention to protect against any manner of ground such as the ground on either conductor or the ground on both conductors occurring simultaneously, and it is an object of my invention to provide a protective system that is easy to install, simple in operation and of comparatively low cost. In the drawings forming a part hereof together with the following description, there is set forth by way of illustration a specific embodiment of my invention.

In the drawings Fig. 1 depicts a power circuit with the essential devices incorporated therein for the working of my invention. Fig. 2 is a vector diagram of the voltages of the open delta transformer, Fig. 3 is a vector diagram of the current to operate the protective device when a ground occurs on both power conductors simultaneously and in Fig. 4 there is shown an alternative system.

Referring to Fig. 1, a three phase alternating current power supply has the incoming lines 11, 12 and 13 connected to stationary contacts 14, 15 and 16 of a magnetically operated switch designated generally by the numeral 41. On the operation of magnetic switch 41 movable contacts 17, 18 and 19 close the circuit to the open delta transformer through stationary contacts 20, 21 and 22 and through conductors 23, 24 and 25, respectively.

The magnetic switch has its coil 26 energized by the incoming power lines 11 and 13 and its circuit comprises conductor 27, coil 26, conductor 28, contacts of ground relay as indicated, conductor 29, pilot switch as indicated and conductor 30. The ground relay circuit is connected as shown from the mid-point of the secondary of the transformer through conductors 31 and 32 to ground. The secondary of the transformer is connected to the load through conductors 33 and 34. As will be noted, the magnetic switch 41 is controlled by the pilot switch and the ground relay contacts. On operation of the ground relay its contacts are latched open by latch 37 as shown and the magnetic switch 41 drops to open position. On removal of ground the procedure would be to open pilot switch, unlatch ground relay contacts and then close pilot switch.

Referring to Fig. 2, the voltages of the secondary of the open delta transformer are shown in vector relationship and with the connection of the ground relay shown at mid-point of transformer or B. The voltage from the points A to B equals that from B to C and either of them equals the voltage from points A to C. Point B is the neutral point of the two windings of the transformer.

Referring to Fig. 3, with a leakage or ground at A or in conductor 33 the current flowing through ground relay would be IAB. With a leakage or ground at point C or in conductor 34 the current through ground relay would be as vector ICB. As indicated, the current IAB equals ICB. Ground occurring simultaneously at point A and B will produce in the ground relay current 1.73 times that of IAB in the ground relay and will be of the vector as indicated by dotted line in Fig. 3.

Referring to Fig. 4 a transformer is used wherein only one of the secondary windings carries the load; the other secondary winding only serving to secure the open delata secondary and to furnish power only for operating the ground or leakage current relay. In this figure the primary transformer conductors are indicated by 53, 54 and 55. The secondary conductors are indicated by 63, 64 and 65. In this alternative system connections must so be made that ground on conductors 63 and 64 will add vectorially. It will be noted points on secondary of transformer as compared to Fig. 1 are transposed with reference to B and C.

The description above shows the working of my invention and that it will take care of all faulty conditions which may occur in the control circuit such as may be used with machinery such as punch presses or the like. The circuit employed is simple and the devices used are essentially an open delta transformer with a relay and pilot switch.

In a two phase power system this same disclosure may be applied to obtain a single phase secondary to function in the same manner with the ground current relay as described herein.

While this invention has been above described by reference to a specific instance of an embodiment thereof, it is intended that the protection of Letters Patent to be granted hereon be not unnecessarily limited thereby, and that such protection extend to the substance of the advance contained in this disclosure and defined in the claims hereto appended.

What I claim as my invention is:

1. A power system wherein disconnection of power will occur on leakage of current comprising an open delta transformer for single phase current energized in the primary by three phase current, the conductors of the secondary of the transformer connected to a load and the neutral point of said secondary connected to ground, and an electro responsive device to be actuated by current in said ground connection.

2. A power system wherein disconnection of power will occur on leakage of current comprising an open delta transformer for single phase current energized in the primary by three phase current, a switch to connect said primary to the three phase current, the conductors of the secondary of the transformer connected to a load and the neutral point of said secondary connected to ground, and an electro responsive device to be actuated by current in said ground connection to cause opening of said switch.

3. A power system wherein disconnection of power will occur on leakage of current comprising an open delta transformer for single phase current energized in the primary by three phase current, a switch to connect said primary to the three phase current, the conductors of the secondary of the transformer connected to a load and the neutral point of said secondary connected to ground, and an electro responsive device to be actuated by current in said ground connection to cause opening of said switch and the secondary transformer connections so arranged that a ground connection occurring simultaneously on the load conductors will cause the currents from such conductors to add vectorially in said electro responsive device.

4. A power system wherein disconnection of power will occur on leakage of current comprising a transformer of two windings in the secondary, the primary windings of said transformer energized by polyphase current, said two secondary windings connected to have a neutral point, conductors connected to the remaining ends of the two windings for a connected load, said neutral point connected to ground and an electro responsive device to be actuated by current occurring in said ground connection to cause disconnection of said polyphase current in the primary of the transformer.

WILLIAM JOHN HUDSON.

REFERENCES CITED

The following references are of record in the file of this patent:

UNITED STATES PATENTS

| Number | Name | Date |
| --- | --- | --- |
| 2,079,636 | Sharp | May 11, 1937 |